March 6, 1951     T. C. HANA     2,544,531
RELAXATION TYPE OF ELECTRICAL MEASURING SYSTEM
Filed Sept. 20, 1946
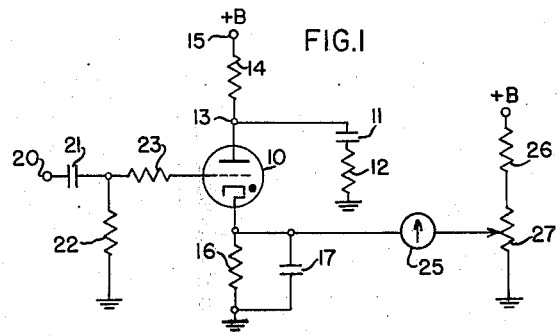
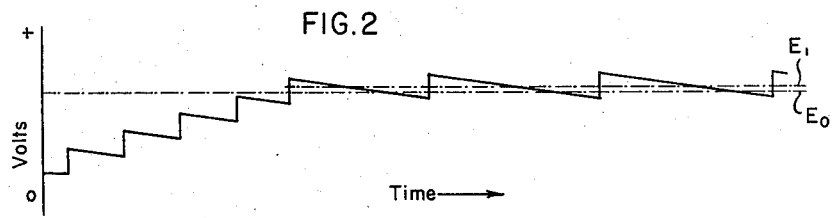
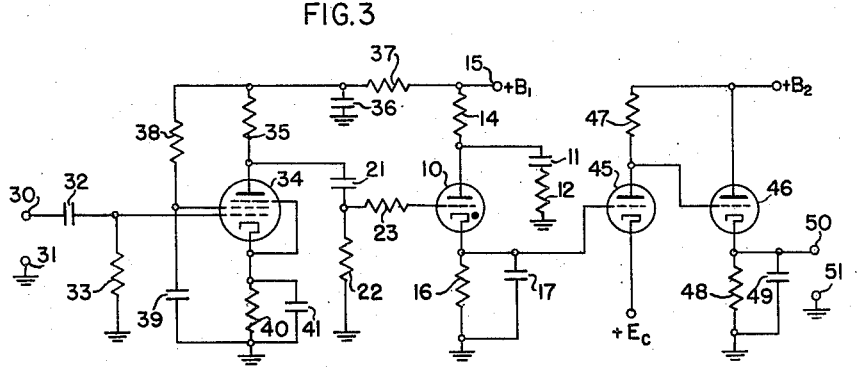
*INVENTOR.*
THOMAS C. HANA
BY
ATTORNEY Patented Mar. 6, 1951

2,544,531

UNITED STATES PATENT OFFICE 2,544,531

RELAXATION TYPE OF ELECTRICAL MEASURING SYSTEM

Thomas C. Hana, Great Neck, N. Y., assignor to Hazeltine Research, Inc., Chicago, Ill., a corporation of Illinois Application September 20, 1946, Serial No. 698,355

5 Claims. (Cl. 171—95)

This invention is directed to electrical systems for deriving an effect or indication representative of an amplitude characteristic of time-spaced pulses. The invention is subject to a wide range of applications and may be utilized, for example, to measure and indicate, or to produce a control effect in accordance with, the amplitude of time-spaced pulses, even though the pulse duration may be exceedingly small. For convenience of presentation, its use in a voltage-measuring system will be considered initially.

Voltage-measuring systems for indicating the peak value of repeating signals of pulse-wave form are known in the art. One prior arrangement comprises a peak rectifier, including a diode and an integrating load circuit. The load circuit is a combination of a resistor and a condenser selected to have a discharge time constant long with reference to the period of the pulses to be measured. In operation, each applied pulse is rectified by the diode to charge the condenser of the load circuit to a value approximating the peak amplitude of the pulse. In this manner a substantially unidirectional potential is established in the load circuit which may be measured and which is indicative of the peak amplitude of the pulses. While a system of this type is satisfactory for many installations, it is subject to certain limitations. For example, in any such system the resistance of the diode and leakage effects in the load circuit conjointly determine the shortest pulse duration and minimum repetition frequency for which accurate measurements may be obtained. This is undesirable especially where the system is to respond over a very wide range of pulse durations and repetition rates.

Another prior system which is also of the peak-rectifier type comprises a so-called "infinite-impedance" rectifier. It has a triode vacuum tube with an integrating load circuit coupled to the cathode and supplying a self-bias for the tube. A vacuum-tube voltmeter is connected to the load circuit and is balanced for zero reading in the absence of applied pulses. Such pulses are applied to the control electrode and, by virtue of peak-rectification phenomenon, change the potential of the load circuit from its no-signal value to a value determined by the peak amplitude of the pulses. This change in potential is indicated by the voltmeter and represents the peak amplitude of the measured pulses. While such an arrangement is an improvement over the simple peak-rectifying system described in the preceding paragraph, it is subject to similar limitations, with reference to the range of pulse durations and repetition frequencies it may accommodate, and yet produces accurate measurements.

It is an object of the present invention, therefore, to provide an electrical system for measuring an amplitude characteristic of time-spaced pulses and which substantially avoids the aforementioned limitations of prior systems.

It is another object of the invention to provide a new and improved electrical system for measuring an amplitude characteristic of time-spaced pulses even though the pulses may be of relatively short duration.

It is a specific object of the invention to provide an improved electrical system for measuring an amplitude characteristic of time-spaced pulses, the durations and repetition frequency of which may vary over relatively wide ranges.

In accordance with the present invention, an electrical system for measuring an amplitude characteristic of time-spaced pulses, the separation of which may have any value within a wide range of values, comprises a vapor-electric discharge device having anode and cathode electrodes. Potential-supply terminals and a load circuit, having a discharge time constant long with reference to the greatest separation of the pulses, are coupled to the discharge device and comprise therewith a relaxation circuit having a normal operating period longer than the greatest separation of the pulses. The system has means for applying the pulses to the relaxation circuit to vary the operating period thereof in accordance with the aforesaid amplitude characteristic of the pulses, thereby to establish in the load circuit a potential having variations representative of such amplitude characteristic of the pulses. A measuring device is so coupled to the load circuit as to respond to the deviations of the potential thereof from a reference potential and thereby indicate the amplitude of the applied pulses.

For a better understanding of the present invention, together with other and further objects thereof, reference is had to the following description taken in connection with the accompanying drawing, and its scope will be pointed out in the appended claims.

In the drawing,

Fig. 1 is a schematic circuit diagram representing an electrical system which embodies the invention; Fig. 2 is a curve utilized in explaining the operation of the system shown in Fig. 1; and Fig. 3 is a schematic representation of a further system including the invention.

Referring now more particularly to Fig. 1, there is represented an electrical system for deriving an effect representative of an amplitude characteristic of time-spaced pulses. Specifically, the system is arranged to derive an indication of the peak amplitude of applied pulses of rectangular wave form and will be particularly described in that connection. The system comprises a vapor-electric discharge device 10 which may be a mercury vapor or gas-filled tube of conventional construction having anode, cathode, and control electrodes.

Potential-supply terminals and a load circuit are coupled to tube 10 and comprise therewith a relaxation circuit. The potential-supply terminals, to be identified presently, facilitate the application of an operating potential to the tube directly from a unidirectional source, such as a battery, or for some applications of the invention it may be obtained from an alternating-current supply. Where an alternating-current potential is employed, its frequency or period should preferably be widely different from the normal operating period of the relaxation circuit. However, for the embodiment under consideration, an energy-storage device or condenser 11 effectively constitutes the operating-potential supply for tube 10. One terminal of this condenser is grounded through a current-limiting resistor 12 while the other is connected to a potential-supply terminal 13, connecting condenser 11 with the anode electrode of the tube. The high-potential terminal of condenser 11 is also connected through a charging resistor 14 to a terminal 15, which may be considered as the high-potential terminal of a unidirectional source indicated +B. The other terminal of this source is grounded, completing a charging circuit for condenser 11 through resistors 12 and 14.

The above-mentioned load circuit of tube 10 comprises the parallel combination of a resistor 16 and a condenser 17, connected between the cathode and ground and completing the circuit of a free-running relaxation oscillator. Elements 16 and 17 are selected so that the load circuit has a discharge time constant that is long with reference to the greatest or maximum separation of the pulses to be measured.

The system also has means for applying time-spaced pulses of positive polarity to the relaxation circuit to vary the operating period thereof. This means is provided by an input terminal 20, coupled by way of a condenser 21 and resistors 22, 23 to the input electrodes of tube 10.

An indicating device 25, such as a microammeter calibrated in volts, or a high-impedance voltmeter, is coupled to load circuit 16, 17 and is responsive to potential variations occasioned therein. It constitutes means for utilizing such potential variations to produce desired amplitude indications. A bleeder circuit, including a unidirectional source +B and series-connected resistors 26 and 27, is also associated with meter 25 through an adjustable tap of resistor 27. This tap constitutes a zero set or adjustment for the meter.

In considering the operation of the described system, it will be assumed initially that no pulses are applied to input terminal 20 and that the source +B has just been connected to terminal 15. Condenser 11 is charged from this source through resistors 12 and 14 until the potential which it applies to tube 10 exceeds the breakdown potential thereof. At that instant, the tube is rendered conductive and condenser 11 discharges therethrough to establish an incremental charge on condenser 17 in the load circuit. When the potential applied by condenser 11 between the anode and cathode of tube 10 falls below the value required to sustain conduction, the tube becomes nonconductive and thereafter condenser 11 recharges. After condenser 11 has reacquired sufficient charge, tube 10 is again rendered conductive and produces an additional incremental charge on condenser 17. This process continues, in the manner indicated by the curve of Fig. 2, until such time that the charge of condenser 17 establishes a cathode potential for tube 10 slightly exceeding the value $E_0$ which holds the tube in a nonconductive condition. This represents the steady state condition of the free-running relaxation circuit.

In the steady state condition, the normal operating period of the relaxation circuit is controlled, largely, by the discharge time constant of load circuit 16, 17. That is, tube 10 remains in its nonconductive state until the charge on condenser 17, dissipating through resistor 16, reduces the cathode potential below the value $E_0$. Thereupon the tube is again rendered conductive to recharge condenser 17 and restore the tube to its nonconductive state. The operating period of the circuit for this normal or steady state condition, is preferably very much longer than the greatest time separation of the pulses to be measured. During such operating intervals, the potential between the cathode and control electrode of tube 10 has a reference or normal value corresponding to the average potential of load circuit 16, 17. This reference value is indicated by broken construction line $E_1$ in Fig. 2. The tap on resistor 27 is set to establish a zero reading on meter 25 in response to this reference potential.

The application of time-spaced pulses of rectangular wave form and positive polarity to terminal 20 modifies the average operating period of the relaxation circuit. Throughout the duration of each applied pulse, the potential of the control electrode of tube 10 is increased in a positive direction relative to that of the described steady state condition. The increased potential of the control electrode effectively lowers the breakdown potential of the tube and thereby increases the relaxation frequency, decreasing its average operating period. The average anode current of tube 10, at the reduced operating period of the relaxation circuit, is increased, causing a corresponding increase in the potential developed in load circuit 16, 17 and applied as a bias potential to the cathode of the tube. The change in operating period is determined by the peak amplitude of the applied pulses and the resulting potential variation in load circuit 16, 17 is linearly related to this peak amplitude. Consequently, the deflection of meter 25 from its zero reading affords a direct indication of the peak amplitude of the signal pulses applied to terminal 20.

The described system provides the desired voltage indications for pulses of widely varying durations, even those which are exceedingly short. The pulse duration need only be long enough to initiate ionization in the tube which thereupon produces the required potential variation in load circuit 16, 17 indicative of the peak pulse amplitude. Furthermore, this system responds to pulses having repetition frequencies that vary over a wide range. The low limit of this range is determined by the pulse repetition frequency at which the energy applied to condenser 17 from potential source 11 is equal to the energy lost by the condenser in the interval between pulses. This fact controls the preferred selection of elements 16 and 17 for operation over the widest range of pulse repetition rates. Obviously, the time constant of these elements must be long with reference to the greatest time separation of the pulses which means that the product of the resistance of element 16 and the capacitance of element 17 must be high. The smaller the value of condenser 17, the less energy is required to establish a charge condition thereon and, therefore, it is expedient to utilize a small condenser. The use of a small condenser dictates the requirement of a large resistor, in order to realize a long discharge time constant. Hence, it is preferred that resistor 16 have as high a value as practical and condenser 17 have as small a value as practical, while still realizing the desired discharge time constant of the load circuit.

In one embodiment of the system of Fig. 1 found to have practical utility, the following circuit constants were used:

| | | |
|---|---|---|
| Tube 10 | Type | 884 |
| Condenser 11 | microfarads | 0.02 |
| Condenser 17 | do | 1 |
| Condenser 21 | do | 0.002 |
| Resistor 12 | ohms | 150 |
| Resistor 14 | do | 22,000 |
| Resistors 16 and 26 | megohm | 1 |
| Resistor 22 | ohms | 100,000 |
| Resistor 23 | do | 10,000 |
| Resistor 27 | do | 500,000 |
| Source +B | volts | 300 |

Through the use of the enumerated circuit constants, a linear relationship has been obtained between the peak amplitude of applied pulses of rectangular wave form and the reading of meter 25. The system was found operable over the range of 50 to 10,000 pulses per second with pulse durations varying from 3½ to 2,600 microseconds.

It will be understood that the pulses applied to terminal 20 need not necessarily have a uniform time separation although that is usually the case. Also, it is contemplated that the pulse amplitude will be substantially constant during any operating interval in which a voltage measurement is being made. Where the duty cycle of a pulse-modulated signal to be measured is appreciable, greatest accuracy is realized by including a D. C. reinserter in the input circuit of tube 10. Reinsertion systems are well known in the television art and may take any of a variety of forms. A convenient and simplified reinserter associated with the input circuit of a triode tube is disclosed in Fig. 262 at page 426 of "Principles of Television Engineering," by Donald G. Fink, McGraw-Hill Book Company, Inc., 1940. An arrangement of that type may be used with tube 10 to facilitate accurate measurements of pulse-modulated signals having a high duty cycle.

While the system of Fig. 1 has been described in connection with time-spaced signals of rectangular pulse-wave form, it is likewise adapted to measure the amplitude of alternating-current signals. The system responds to the peak positive amplitude of an applied wave signal with respect to the average value thereof and thus indicates the peak value of A. C. signals of sinusoidal wave form. It will be obvious to those skilled in the art that the input circuit of tube 10 may be arranged so that the system measures the peak-to-peak value of the applied signal, whether it be of sinusoidal or other wave form. Additionally, the omission of condenser 21 in the input circuit of tube 10 enables the system to measure direct-current signals which may be construed as repeating pulses having a zero time separation.

The invention is not limited in application to the measurement and indication of the amplitude of time-spaced pulses. If desired, it may be utilized to provide a control effect or signal for performing a control function in accordance with the amplitude of applied pulses. The use of the invention for this purpose is illustrated in the electrical system represented schematically in Fig. 3. This system has input terminals 30, 31 for receiving time-spaced pulses of negative polarity. These terminals are coupled by means of a condenser 32 and resistor 33 to the input electrodes of a pentode-type vacuum tube 34 arranged in a conventional pulse amplifier circuit. The anode of tube 34 is coupled to potential-supply terminal 15 through a resistor 35 and a filter comprising a shunt-connected condenser 36 and series resistor 37. The suppressor electrode of the tube is connected directly to the cathode and a screen potential is obtained through a resistor 38, the screen being bypassed in conventional manner by a condenser 39. A cathode resistor 40, bypassed by a condenser 41, provides a self-bias for the tube. The output circuit of the amplifier is connected to a free-running relaxation circuit which is generally similar to that of Fig. 1, corresponding components thereof being designated by the same reference characters. The load circuit 16, 17 is connected to the control electrode of a control tube 45 for a series-type regulator tube 46. The anode of tube 45 is connected through a resistor 47 to a potential source +B2 and the cathode is associated with a bias source of positive polarity, indicated +Ec. The output circuit of this tube is connected with the control electrode of regulator tube 46, the latter comprising a cathode-follower stage having a cathode load provided by a resistor 48 and condenser 49. Terminals 50, 51 are coupled with the load circuit 48, 49 to supply a controlled output potential from the system.

In the operation of this system, a positive potential having a normal or reference value, as explained in connection with the discussion of Fig. 1, is developed in load circuit 16, 17 in the absence of applied pulses. This positive potential is applied to the input circuit of tube 45 but the bias source +Ec is selected to hold this tube in its nonconductive condition for such operating intervals. Accordingly, regulator tube 46 is fully conductive and applies a maximum output potential to terminals 50, 51. The application of time-spaced pulses of negative polarity to input terminals 30, 31 increases the positive potential developed in the load circuit 16, 17 as aforedescribed. The increased potential of the load circuit renders tube 45 conductive and decreases the conductivity of the regulator tube 46. In this fashion, the output potential available at terminals 50, 51 is varied directly with the peak amplitude of the applied pulses. Therefore, tube 45 comprises means for deriving from load circuit 16, 17 a control effect determined by the peak amplitude of the applied pulses and utilized to control regulator tube 46.

While there has been described what is at present considered to be the preferred embodiment of this invention, it will be obvious to those skilled in the art that various changes and modifications may be made therein without departing from the

What is claimed is:

1. An electrical system for measuring the amplitude of time-spaced pulses, the separation of which may have any value within a wide range of values, comprising: a vapor-electric discharge device having anode and cathode electrodes; potential-supply terminals and a load circuit, having a discharge time constant long with reference to the greatest separation of said pulses, coupled to said discharge device and comprising therewith a relaxation circuit having a normal operating period longer than the greatest separation of said pulses; means for applying said pulses to said relaxation circuit to vary the operating period thereof in accordance with said amplitude characteristic of said pulses, thereby to establish in said load circuit a potential having variations representative of said amplitude characteristic of said pulses; and a measuring device so coupled to said load circuit as to respond to deviations of said potential from a reference level and thereby indicate the amplitude of said pulses.

2. An electrical system for measuring the amplitude of time-spaced pulses, the separation of which may have any value within a wide range of values, comprising: a vapor-electric discharge device having anode, cathode and control electrodes; potential-supply terminals and a load circuit, having a discharge time constant long with reference to the greatest separation of said pulses, coupled to said discharge device and comprising therewith a relaxation circuit having a normal operating period longer than the greatest separation of said pulses; means for applying said pulses to said control electrode to vary the operating period of said relaxation circuit in accordance with said amplitude characteristic of said pulses, thereby to establish in said load circuit a potential having variations representative of said amplitude characteristic of said pulses and a bridge network including said load circuit and an indicating device so proportioned as to measure the variations of said load circuit potential.

3. An electrical system for measuring the peak amplitude of time-spaced pulses, the separation of which may have any value within a wide range of values, comprising: a vapor-electric discharge device having anode and cathode electrodes; potential-supply terminals and a load circuit, having a discharge time constant long with reference to the greatest separation of said pulses, coupled to said discharge device and comprising therewith a relaxation circuit having a normal operating period longer than the greatest separation of said pulses; means for applying said pulses to said relaxation circuit to vary the operating period thereof in accordance with the peak amplitude of said pulses, thereby to establish in said load circuit a potential having variations relative to a reference potential level and representative of the peak amplitude of said pulses; and a measuring device so coupled to said load circuit as to respond to said potential variations and indicate the amplitude of said pulses.

4. An electrical system for measuring the amplitude of time-spaced pulses, the separation of which may have any value within a wide range of values, comprising: a vapor-electric discharge device having anode and cathode electrodes; an energy-storage device having one terminal grounded and having another terminal connected to said anode; a potential-supply terminal connected to said other terminal of said energy-storage device and included in a charging circuit therefor; a load circuit, having a discharge time constant long with reference to the greatest separation of said pulses, connected between said cathode and ground to comprise with said discharge device and said energy-storage device a free-running relaxation circuit having a normal operating period longer than the greatest separation of said pulses; means for applying said pulses to said relaxation circuit to vary the operating period thereof in accordance with said amplitude characteristic of said pulses; thereby to establish in said load circuit a potential having variations representative of said amplitude characteristic of said pulses; and a measuring device so coupled to said load circuit as to respond to deviations of said potential from a reference level and thereby indicate the amplitude of said pulses.

5. An electrical system for measuring the amplitude of time-spaced pulses, the separation of which may have any value within a wide range of values, comprising: a vapor-electric discharge device having anode and cathode electrodes; potential-supply terminals and a load circuit being so proportioned as to have a discharge time constant long with reference to the greatest separation in time of said pulses, said load circuit being coupled to said discharge device and comprising therewith a relaxation circuit having a normal operating period longer than the greatest separation in time of said pulses; means for applying said pulses to said relaxation circuit to vary the operating period thereof in accordance with said amplitude characteristic of said pulses, thereby to establish in said load circuit a potential having variations from a reference level in accordance with said amplitude characteristic of said pulses, and means coupled to said load circuit and responsive to said potential variations for deriving a control effect representing a measure of said amplitude characteristic of said pulses.

THOMAS C. HANA.

REFERENCES CITED

The following references are of record in the file of this patent:

UNITED STATES PATENTS

| Number | Name | Date |
| --- | --- | --- |
| 2,236,015 | Sonnentag | Mar. 25, 1941 |
| 2,288,554 | Smith | June 30, 1942 |
| 2,397,540 | Dome | Apr. 2, 1946 |
| 2,419,607 | Terry et al. | Apr. 29, 1947 |
| 2,434,297 | Test et al. | Jan. 13, 1948 |